United States Patent Office 3,151,114
Patented Sept. 29, 1964

3,151,114
1,2,3,4 - TETRAHYDRO - 1 - (2 - MERCAPTO - 6-BENZOTHIAZOLYL) - 2 - THIOXO - 4,4,6 - TRIMETHYLPYRIMIDINE AND DERIVATIVES
John J. D'Amico, Charleston, W. Va., and Ching C. Tung, Kirkwood, Mo., assignors to Monsanto Company, St. Louis, Mo., a corporation of Delaware
No Drawing. Filed Sept. 15, 1961, Ser. No. 138,296
11 Claims. (Cl. 260—256.5)

The present invention relates to 1,2,3,4-tetrahydro-1-(2 - mercapto-6-benzothiazolyl)-2-thioxo-4,4,6-trimethylpyrimidine and derivatives thereof.

1,2,3,4 - tetrahydro-1-(2-mercapto-6-benzothiazolyl)-2-thioxo-4,4,6-trimethylpyrimidine can exist in two tautomeric forms as follows:

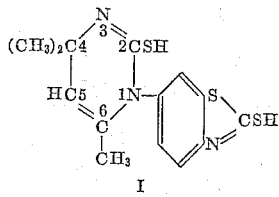

I and

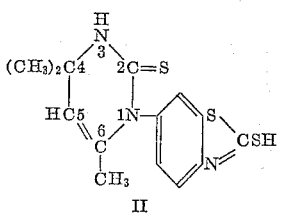

II

The structure is undoubtedly II predominately. For example a disodium salt does not form. Of course, the same tautomerism is possible in the mercaptothiazole nucleus but the mercaptan structure is generally accepted and is consistent with the chemical properties observed. The preparation and properties of this compound are described in detail below:

EXAMPLE 1

To a stirred slurry containing 79.0 grams (0.5 mole) of 1,1-dimethyl-3-oxobutylthiocyanic acid, 750 ml. of water and 6 grams of concentrated sulfuric acid was added in one portion 91.1 grams (0.5 mole) of 6-amino-2-mercaptobenzothiazole and the mixture heated at 80–90° C. for a period of 3 hours. After cooling to 25° C., the precipitate was collected by filtration, washed with water until the washings were neutral to litmus and air-dried at 25–30° C. 1,4-dihydro-1-(2-mercapto-6-benzothiazolyl)-4,4,6-trimethyl-2-pyrimidinethiol (predominately 1,2,3,4-tetrahydro-1-(2-mercapto - 6 - benzothiazolyl)-2-thioxo-4,4,6-trimethylpyrimidine) was obtained in 97.5% yield. After recrystallization from dilute ethyl alcohol it melted at 207–309° C. Analysis gave 13.07% nitrogen and 29.34% sulfur compared to 13.07% nitrogen and 29.72% sulfur calculated for $C_{14}H_{15}N_3S_3$. This compound accelerates vulcanization of natural and synthetic rubber and imparts considerable processing safety. It is also a valuable intermediate and undergoes reactions typical of those known for mercaptobenzothiazole involving the mercaptan radical.

As exemplary of the accelerating activity of this compound, a rubber stock was compounded comprising

| | Parts by weight |
|---|---|
| Smoked sheets rubber | 100 |
| Carbon black | 50 |
| Zinc oxide | 5 |
| Stearic acid | 3 |
| Saturated hydrocarbon softener | 3 |
| Sulfur | 2.5 |
| Antioxidant | 1.5 |
| Product of Example 1 | 0.5 |

The stock so compounded was cured in the usual manner by heating in a press for different periods of time at 144° C. Processing safety was evaluated by means of a Mooney plastometer. The figure recorded as "Mooney Scorch" was the time required for the Mooney plasticity at 135° C. to rise ten points above the minimum value. The physical properties of the vulcanizate at optimum cure and Mooney scorch of the uncured composition are set forth below:

Table I

| Modulus of Elasticity in lbs./in.$^2$ at Elongation of 300% | Tensile at Break in, lbs./in.$^2$ | Mooney Scorch (mins.) |
|---|---|---|
| 1,490 | 2,450 | 13.3 |

The Mooney scorch of a stock containing 0.5 part of mercaptobenzothiazole in the same base was 6.1 minutes.

Since the mercapto hydrogen in the thiazole ring is active a variety of derivatives can be obtained by replacing the hydrogen by other groups, as for example salt forming groups and organic radicals. Among the organic radicals which may replace hydrogen are alkyl, alkenyl, halogen substituted alkenyl, dialkylaminoethyl, 2-butenylene, 2-butynyl, 2-propynyl, 2-cyclohexenyl, 2-oxocyclohexyl, 5,5,7,7 - tetramethyl - 2 - octenyl, —$CH_2$—NH— groups such as

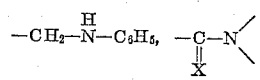

where X is sulfur or oxygen and the valences on the nitrogen may be satisfied by open or closed chain aliphatic radicals or divalent radicals which with nitrogen constitute a heterocyclic group, or phenyl,

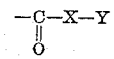

groups where X is sulfur or oxygen and Y is lower alkyl or alkenyl,

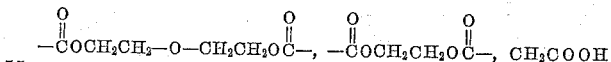

and chlorophenoxyacetyl. These of course are only illustrative of a few of the possible derivatives. All of them accelerate vulcanization to a greater or less degree. Replacing mercapto hydrogen with radicals which inactive mercaptobenzothiazole do not appear to have the same effect on the product of Example 1.

SULFIDES

Another group of derivatives within the scope of this invention are the sulfides. The disulfide may be prepared directly from the mercaptan or mercaptide by oxidation.

The reaction may be conveniently carried out in aqueous medium employing either a suspension of the mercaptan or a solution of an alkali metal salt thereof. The monosulfide may be prepared from the disulfide by reacting the latter with sodium cyanide. The term "free mercaptan" hereinafter designates the product of Example 1. The following illustrates in detail the preparation of the disulfide:

EXAMPLE 2

A stirred slurry containing 32.2 grams (0.1 mole) of free mercaptan, 700 ml. of water and 16 grams (0.1 mole) of 25% aqueous sodium hydroxide was heated to 70° C. for solution. After cooling the stirred solution to 25° C., 25.1 grams (0.11 mole) of ammonium persulfate in 100 ml. of water was added dropwise at 25–30° C. over a 45 minute period. The reaction mixture was stirred at 25–30° C. for 6 hours. The resulting precipitate was collected by filtration, washed with water until the washings were neutral to litmus and air-dried at 50° C. 1,1'-[2,2'-dithiobis(6 - benzothiazolyl)]bis(1,2,3,4 - tetrahydro - 2 - thioxo-4,4,6-trimethylpyrimidine) was obtained in 99.5% yield as a tan solid melting with decomposition at 260-265° C. After recrystallization from dimethylformamide it melted with decomposition at 266–268° C. Analysis gave 12.94% nitrogen compared to 13.11% calculated for $C_{28}H_{28}N_6S_6$.

The yield was 90% by the following procedure: The free mercaptan (0.1 mole), 500 ml. of water and 32 grams (0.2 mole) of 25% aqueous sodium hydroxide were heated to 70° C. for solution. To this stirred solution was added dropwise at 25–30° C. a solution containing 25.6 grams of iodine and 27.6 grams of potassium iodide in 520 ml. of water over a 35 minute period. The resulting slurry was stirred at 25–30° C. for an additional 30 minutes. The product isolated as above melted with decomposition at 266–268° C. Analysis gave 12.86% nitrogen.

MERCAPTOMETHYLENEAMINES

A still further group of compounds within the scope of this invention are compounds believed to be mercaptomethyleneamines derived from the mercaptan, formaldehyde and aromatic, aliphatic or heterocyclic amines. Examples of such are represented by the following:

EXAMPLE 3

To a stirred solution of 11.6 grams (0.1 mole) of N-nitrosopiperazine and 50 ml. of water was added dropwise at 5–10° C. in 10 minutes 8 grams (0.1 mole) of 37% formaldehyde. A slurry containing 32.2 grams (0.1 mole) of free mercaptan in 250 ml. acetone was then added in one portion and the mixture stirred at 25–30° C. for 24 hours. The resulting solution was added to 1000 grams of ice-water and stirred at 0–10° C. for one hour. The liquid was decanted and the wet solid dried on a porous plate. 1,2,3,4-tetrahydro-2-thioxo-1-[2-(p - nitrosopiperazinomethylthio)-6-benzothiazolyl]-4,4,6-trimethylpyrimidine was obtained in 53.6% yield as a yellow-brown solid melting at 115-123° C.

EXAMPLE 4

To a stirred slurry of 32.2 grams (0.1 mole) of free mercaptan and 300 ml. of ethyl alcohol was added with stirring 8.9 grams (0.11 mole) of 37% formaldehyde and 10 grams (0.1 mole) of hexamethyleneimine. The mixture was then stirred at 25–30° C. for 24 hours. After cooling to 5° C., the precipitate was collected by filtration and air-dried at 25–30° C. 1,4-dihydro-1-[2-(hexamethyleniminemethylthio) - 6 - benzothiazolyl] - 1,2,3,4 - tetrahydro - 2 - thioxo - 4,4,6-trimethylpyrimidine was obtained in 60% yield as a tan solid melting at 208–210° C. with decomposition. Analysis gave 12.85% nitrogen compared to 12.95% calculated for $C_{21}H_{28}N_4S_3$.

EXAMPLE 5

A stirred slurry containing 13 grams (0.04 mole) of free mercaptan, 100 ml. of ethyl alcohol, 3.8 grams (0.041 mole) of 37% formaldehyde and 3.7 grams (0.04 mole) of aniline was stirred at 25–30° C for 2 hours. The product was collected by filtration, washed with 200 ml. of water and air-dried at 25–30° C. 1-[(2-anilinomethylthio] - 6-benzothiazolyl]-1,2,3,4-tetrahydro-2-thioxo-4,4,6-trimethylpyrimidine was obtained in 82.2% yield as a tan solid melting at 181–183° C. after recrystallization from ethyl alcohol. Analysis gave 13.66% nitrogen and 22.58% sulfur compared to 13.13% nitrogen and 22.55% sulfur calculated for $C_{21}H_{22}N_4S_3$.

TRIAZINES

EXAMPLE 6

A solution was prepared containing 32.2 grams (0.1 mole of the free mercaptan and 6.6 grams (0.1 mole) of 85% potassium hydroxide in 500 ml. of acetone. To this solution a solution of 6.2 grams (0.033 mole) of cyanuric chloride in 25 ml. of acetone was added in one portion at 40° C. The reaction mixture was then heated with stirring at 50–60° C. for 5 hours. After cooling to 25° C., 500 ml. of water was added and stirring continued for 15 minutes. The precipitate was collected by filtration, washed with water until neutral to litmus and dried at room temperature. 2,4,6-tris-[6-(1,2,3,4-tetrahydro - 2 - thioxo - 4,4,6 - trimethyl-1-pyrimidinyl)-benzothiazolylthio]-s-triazine was obtained in 98% yield as a cream solid melting above 300° C. Analysis gave 15.68% nitrogen compared to 16.17% calculated for $C_{45}H_{42}N_{12}S_9$.

EXAMPLE 7

To a stirred solution containing 20.2 grams (0.062 mole) of free mercaptan, 500 ml. of acetone, 10 ml. of water and 4 grams (0.0624 mole) of 90% potassium hydroxide was added in one portion 11.9 grams (0.031 mole) of N-phenothiazolyl dichlorotriazine. The stirred reaction mixture was heated at 55–56° C for 24 hours. After cooling to 25° C. the reaction mixture was added to 1000 grams of ice-water and stirred for 15 minutes. The solid was collected by filtration, washed with water until neutral to litmus and air-dried at 25–30° C. 10-{2.6 - bis[6 - (1,2,3,4-tetrahydro-2-thioxo-4,4,6-trimethyl-pyrimidin - 1 - yl)benzothiazol - 2-ylthio]s-triazin-4-yl}-phenothiazine melting above 300° C. was obtained in 94.5% yield. Analysis gave 15.36% nitrogen compared to 15.27% calculated for $C_{43}H_{36}N_{10}S_7$.

SALTS

Salts of the free mercaptan are illustrated by ammonium, alkali metal, alkaline earth metal, Zn, Cu, Pb, Fe, Ni, Mn and amine addition salts from cyclohexylamine, N-methylcyclohexylamine, N,N-dimethylcyclohexylamine, ethanolamine, diethanolamine, triethanolamine, morpholine, dimethylamine, diethylamine, dipropylamine, diisopropylamine, dibutylamine, dodecylamine and ethylenediamine. Examples 8 and 9 illustrate the preparation of salts.

EXAMPLE 8

A charge containing 32.2 grams (0.1 mole) of free mercaptan, 500 ml. of water and 16 grams (0.1 mole) of 25% sodium hydroxide was stirred and heated at 70° C. for 15 minutes. To this stirred resultant solution, at 40° C., was added in one portion 6.8 grams (0.05 mole) of zinc chloride dissolved in 500 ml. of water and the reaction mixture stirred for 2 hours. The resultant precipitate was collected by filtration, washed with water until the washings were neutral to litmus and air-dried at 25–30° C. S-zinc 1,2,3,4-tetrahydro-2-thioxo-1-(2-mercapto - 6 - benzothiazolyl)-4,4,6-trimethylpyrimidine was obtained in 99% yield melting above 300° C.

Analysis gave 11.76% nitrogen compared to 11.90% calculated for $C_{28}H_{28}N_6S_6Zn$.

EXAMPLE 9

To a stirred slurry of 32.2 grams (0.1 mole) of free mercaptain and 600 ml. of ethyl ether was added in one portion 11 grams (0.11 mole) of hexamethyleneimine. The reaction mixture was stirred at 25–30° C. for 3 hours, the precipitate collected by filtration and air-dried at 25–30° C. The hexamethylenimine salt of 6-(1,2,3,4-tetrahydro - 2 - thioxo-4,4,6-trimethyl-1-pyrimidinyl)-2-benzothiazolethiol was obtained in 79.2% yield as a grey solid melting at 185–187° C. Analysis gave 13.03% nitrogen and 22.53% sulfur compared to 13.32% nitrogen and 22.87% sulfur calculated for $C_{20}H_{28}N_4S_3$.

THIOETHERS

Further examples of the new products are thioethers but the examples below are not to be taken as limitative.

EXAMPLE 10

A charge containing 32.2 grams (0.1 mole) of free mercaptan, 500 ml of water and 16 grams (0.1 mole) of 25% sodium hydroxide was stirred and heated to 70° C. and then cooled to 40° C. To this stirred resultant solution was added in one portion 18 grams (0.1 mole) of 1,2,3,3-tetrachloro-2-propene and the stirred reaction mixture heated at 50–60° C. for 4 hours. After cooling to 25° C., the water was decanted. To the sticky residue was added 200 ml. of ethyl alcohol, the mixture stirred and heated to refluxing temperature. The product was then cooled to 25° C., precipitate collected by filtration and air-dried at 25–30° C. 1,2,3,4-tetrahydro-2-thioxo-1[2 - (2,3,3 - trichloroallylthio) - 6-benzothiazolyl]-4,4,6-trimethylpyrimidine was obtained in 51.5% yield as a tan solid melting at 200–202° C. Analysis gave 8.84% nitrogen, 20.61% sulfur and 22.95% chlorine compared to 9.04% nitrogen, 20.69% sulfur and 22.88% chlorine calculated for $C_{17}H_{16}Cl_3N_3S_3$.

EXAMPLE 11

Replacing the 1,2,3,3-tetrachloro-2-propene of Example 10 with 14.5 grams (0.1 mole) of cis- and trans-1,2,3-trichloropropene, 1 - [2-(2,3-dichloroallylthio)-6-benzothiazolyl] - 1,2,3,4 - tetrahydro - 2-thioxo-4,4,6-trimethylpyrimidine was obtained in 23.2% yield as a tan solid melting at 182–186° C. Analysis gave 9.58% nitrogen, 22.16% sulfur and 16.78% chlorine compared to 9.76% nitrogen, 22.35% sulfur and 16.47% chlorine calculated for $C_{17}H_{17}Cl_2N_3S_3$.

EXAMPLE 12

A charge containing 32.2 grams (0.1 mole) of free mercaptan, 500 ml. of water and 16 grams (0.1 mole) of 25% sodium hydroxide was stirred and heated at 70° C. for 15 minutes. To this resultant solution at 40° C. was added 7.7 grams (0.1 mole) of allyl chloride. The stirred reaction mixture was heated at 50–60° C. for 3 hours. After cooling to 25° C., the solid was collected by filtration, washed with water until the washings were neutral to litmus and air-dried at 25–30° C. 1-(2-allylthio-6-benzothiazolyl) - 1,2,3,4 - tetrahydro - 2 - thioxo-4,4,6-trimethylpyrimidine was obtained in 99.5% yield as a tan solid melting at 190–195° C. After recrystallization from a mixture of ethyl alcohol, ethyl acetate and chloroform it melted at 202–203° C. Analysis gave 12.02% nitrogen and 26.05% sulfur compared to 11.62% nitrogen and 26.61% sulfur calculated for $C_{17}H_{19}N_3S_3$.

The following tan solids were prepared employing the procedure of Example 12 by reacting the free mercaptan and the appropriate halide:

NO. 13

1,2,3,4 - tetrahydro - 2 - thioxo-4,4,6-trimethyl-1-[2-(2-propynylthio) - 6 - benzothiazolyl]-pyrimidine in 97.5% yield from 3 - bromo - 1-propyne. The reactants were maintained at 25–30° C. for 6 hours. M.P. 204–206° C. after recrystallization from chloroform. Analysis gave 11.23% nitrogen compared to 11.69% calculated for $C_{17}H_{17}N_3S_3$.

NO. 14

1 - [2 - (3,3-dichloroallylthio)-6-benzothiazolyl]-1,4-dihydro-4,4,6-trimethylpyrimidine in 81.4% yield from 3,3-dichloroallyl chloride. M.P. 187–188° C. after recrystallization from ethyl acetate and chloroform. Analysis gave 9.74% nitrogen compared to 9.76% calculated for $C_{17}H_{17}Cl_2N_3S_3$.

NO. 15

1 - [2 - (2 - chloroallylthio)-6-benzothiazolyl]-1,2,3,4-tetrahydro-2-thioxo-4,4,6-trimethylpyrimidine in 93.5% yield from 2-chloroallyl chloride. M.P. 202–203° C. after recrystallization from benzene and chloroform. Analysis gave 10.32% nitrogen compared to 10.61% calculated for $C_{17}H_{18}ClN_3S_3$.

NO. 16

1 - [2 - (3-chloro-2-butenylthio)-6-benzothiazolyl]-1,2,3,4 - tetrahydro - 2 - thioxo - 4,4,6-trimethylpyrimidine in 92.5% yield from 1,3-dichloro-2-butene. M.P. 159–161° C. after recrystallization from ethyl acetate and chloroform. Analysis gave 10.33% nitrogen and 8.69% chlorine compared to 10.25% nitrogen and 8.64% chlorine calculated for $C_{18}H_{20}ClN_3S_3$.

NO. 17

1,1' - [2,2'-(2-butenylenedithio)bis(6-benzothiazolyl)]-bis(1,2,3,4 - tetrahydro - 2-thioxo - 4,4,6-trimethylpyrimidine) in 98% yield employing one-half mole of 1,4-dichloro - 2 - butene. M.P. 155–160° C. Analysis gave 11.98% nitrogen compared to 12.09% calculated for $C_{32}H_{34}N_6S_6$.

NO. 18

1,1' - [2,2' - (butynylenedithio)bis(6-benzothiazolyl)]-bis(1,2,3,4 - tetrahydro - 2 - thioxo-4,4,6-trimethylpyrimidine) in 72.2% yield employing one-half mole of 1,4-dichloro - 2 - butyne. The reactants were maintained at 25–30° C. for 6 hours. M.P. above 300° C. Analysis gave 11.87% nitrogen compared to 12.13% calculated for $C_{32}H_{32}N_6S_6$.

NO. 19

1 - [2-(2-diethylaminoethylthio)-2-benzothiazolyl]-1,2,3,4 - tetrahydro - 2 - thioxo - 4,4,6-trimethylpyrimidine in 97.5% yield from diethylaminoethylchloride hydrochloride. The reaction mixture was heated at 50–60° C. for 5 hours. Another difference from Example 12 was that 0.2 mole of 25% sodium hydroxide was employed. M.P. 160–162° C. after recrystallization from ethyl alcohol. Analysis gave 12.72% nitrogen compared to 13.32% calculated for $C_{20}H_{28}N_4S_3$.

NO. 20

1 - [2 - (2-dimethylaminoethylthio)-6-benzothiazolyl]-1,2,3,4 - tetrahydro-2-thioxo-4,4,6-trimethylpyrimidine in 94.5% yield from dimethylaminethylchloride hydrochloride. The reactants were heated at 50–60° C. for 5 hours and again 0.2 mole of 25% sodium hydroxide was employed. M.P. 185–187° C. after recrystallization from ethyl alcohol. Analysis gave 14.26% nitrogen compared to 14.27% calculated for $C_{18}H_{24}N_4S_3$.

CARBAMATES

Preferred derivatives for accelerating vulcanization of rubber are carbamates. These have the common grouping

where X is oxygen or sulfur. As illustrative of their preparation are the following:

EXAMPLE 21

A solution containing 32.2 grams (0.1 mole) of free mercaptan, 6.3 grams (0.1 mole) of 90% potassium hydroxide, 500 ml. of acetone and 10 ml. of water was heated to 56° C. While stirring the resultant solution at 25° C. there was added in one portion 10.8 grams (0.1 mole) of dimethylcarbamyl chloride. The reaction mixture was stirred at 25–30° C. for 5½ hours and then added to 1000 grams of ice-water. Stirring was continued at 0–10° C. for 30 minutes. The precipitate was collected by filtration, washed with water until the washings were neutral to litmus and air-dried at 25–30° C. 6-(1,2,3,4 - tetrahydro - 2-thioxo-4,4,6-trimethyl-1-pyrimidinyl)-2-benzothiazolyl dimethylthiolcarbamate was obtained in 61.4% yield as a tan solid melting at 196–198° C. after recrystallization from ethyl alcohol/acetone mixture. Analysis gave 13.70% nitrogen and 24.99% sulfur compared to 14.27% nitrogen and 24.51% sulfur calculated for $C_{17}H_{20}N_4OS_3$.

Employing the same procedure and substituting the appropriate halide, other products prepared were:

NO. 22

6 - (1,2,3,4 - tetrahydro - 2-thioxo-4,4,6-trimethyl-1-pyrimidinyl) -2-benzothiazolyl N-ethyldithiocarbanilate in 97.5% yield from N-ethylphenylthiocarbamyl chloride. The reaction mixture was stirred at 25–30° C. for 24 hours. The product was a tan solid melting at 173–175° C. after recrystallization from dilute acetone. Analysis gave 10.82% nitrogen compared to 11.56% calculated for $C_{23}H_{24}N_4S_4$.

NO. 23

6 - (1,2,3,4 - tetrahydro - 2-thioxo-4,4,6-trimethyl-1-pyrimidinyl)-2-benzothiazolyl 1-pyrrolidinecarbothiolate in 52.5% yield from 1-pyrrolidinecarbamyl chloride. The reaction mixture was stirred at 25–30° C. for 5½ hours. The product was a yellow-green solid melting at 181–183° C. after recrystallization from dilute acetone. Analysis gave 12.96% nitrogen compared to 13.39% calculated for $C_{19}H_{22}N_4OS_3$.

NO. 24

6 - (1,2,3,4 - tetrahydro - 2-thioxo-4,4,6-trimethyl-1-pyrimidinyl) - 2-benzothiazolyl 1-pyrrolidinecarbodithioate in 11.5% yield from 1-pyrrolidinethiocarbamyl chloride. The reaction mixture was stirred at 25–30° C. for 24 hours. The product was a tan solid melting at 218–220° C. with decomposition. Analysis gave 12.16% nitrogen compared to 12.89% calculated for $C_{19}H_{22}N_4S_4$.

NO. 25

6 - (1,2,3,4 - tetrahydro - 2-thioxo-4,4,6-trimethyl-1-pyrimidinyl)-2-benzothiazolyl 1-piperidinecarbodithioate in 89.4% yield from piperidinethiocarbamyl chloride. The reaction mixture was stirred at 25–30° C. for 24 hours. The product was a tan solid melting at 151–153° C. after recrystallization from alcohol/chloroform. Analysis gave 11.93% nitrogen and 28.44% sulfur compared to 12.49% nitrogen and 28.59% sulfur calculated for $C_{20}H_{24}N_4S_4$.

NO. 26

6 - (1,2,3,4 - tetrahydro-2-thioxo-4,4,6-trimethyl-1-pyrimidinyl) - 2-benzothiazolyl-2,6-dimethylmorpholinocarbodithioate in 41.9% yield from 2,6-dimethylmorpholinethiocarbamyl chloride. A semi-solid resulted after adding 1000 grams of ice-water and stirring at 0–10° C. for an hour. To this semi-solid was added 500 ml. of ethyl ether and stirring was continued at 0–10° C. for another thirty minutes. A precipitate then formed which was isolated as hereinbefore described. The product was a tan solid melting at 173–174° C. after recrystallization from dilute acetone. Analysis gave 11.89% nitrogen and 26.25% sulfur compared to 11.70% nitrogen and 26.78% sulfur calculated for $C_{21}H_{26}N_4OS_4$.

In the following preparations the solution was made up of 32.2 grams (0.1 mole) of free mercaptan, 500 ml. of acetone and 6.6 grams (0.1 mole) of 85% potassium hydroxide.

NO. 27

6 - (1,2,3,4 - tetrahydro-2-thioxo-4,4,6-trimethyl-1-pyrimidinyl) - 2 - benzothiazolyl diethyldithiocarbamate in 96.5% yield from diethylthiocarbamyl chloride dissolved in 100 ml. of acetone. The stirred reaction mixture was maintained at 25–30° C. for 5½ hours. The product was a tan solid melting at 227° C. after recrystallization from chloroform and ethyl acetate. Analysis gave 12.30% nitrogen compared to 12.83% calculated for $C_{19}H_{24}N_4S_4$.

NO. 28

6 - (1,2,3,4 - tetrahydro-2-thioxo-4,4,6-trimethyl-1-pyrimidinyl) - 2 - benzothiazolyl dimethyldithiocarbamate in 61.3% yield from dimethylthiocarbamyl chloride dissolved in 100 ml. of acetone. The product was a tan solid melting at 213–215° C. after decrystallization from chloroform and ethyl alcohol. Analysis gave 13.98% nitrogen compared to 13.71% calculated for $C_{17}H_{20}N_4S_4$.

NO. 29

6 - (1,2,3,4 - tetrahydro-2-thioxo-4,4,6-trimethyl-1-pyrimidinyl)-2-benzothiazolyl morpholinecarbodithioate in 97.5% yield from morpholinethiocarbamyl chloride. The product was a tan solid melting at 199–201° C. after recrystallization from chloroform and ether. Analysis gave 12.25% nitrogen compared to 12.43% calculated for $C_{19}H_{22}N_4OS_4$.

NO. 30

6 - (1,2,3,4 - tetrahydro-2-thioxo-4,4,6-trimethyl-1-pyrimidinyl)-2-benzothiazolyl diisopropyldithiocarbamate in 88.2% yield from diisopropylthiocarbamyl chloride. The product was a tan solid melting at 197–199° C. after recrystallization from chloroform and ether. Analysis gave 12.27% nitrogen and 27.36% sulfur compared to 12.06% nitrogen and 27.60% sulfur calculated for $C_{21}H_{28}N_4S_4$.

NO. 31

6 - (1,2,3,4-tetrahydro - 2 - thioxo-4,4,6-trimethyl-1-pyrimidinyl)-2-benzothiazolyl dibutyldithiocarbamate in 99.5% yield from dibutylthiocarbamyl chloride. The product was a tan solid melting at 180–182° C. after recrystallization from chloroform and ether. Analysis gave 25.82% sulfur compared to 26.03% calculated for $C_{23}H_{32}N_4S_4$.

NO. 32

6 - (1,2,3,4 - tetrahydro-2-thioxo-4,4,6-trimethyl-1-pyrimidinyl) - 2 - benzothiazolyl diethylthiolcarbamate in 76.0% yield from diethylcarbamyl chloride. The product was a tan solid melting at 144–146° C. Analysis gave 13.39% nitrogen and 23.08% sulfur compared to 13.32% nitrogen and 22.87% sulfur calculated for $C_{19}H_{24}N_4OS_3$.

No. 33

6 - (1,2,3,4 - tetrahydro-2-thioxo-4,4,6-trimethyl-1-pyrimidinyl)-2-benzothiazolyl dipropyldithiocarbamate in 54.0% yield from dipropylthiocarbamyl chloride. The product was a tan solid melting at 185–187° C. after recrystallization from chloroform and ether. Analysis gave 12.12% nitrogen and 26.95% sulfur compared to 12.06% nitrogen and 27.60% sulfur calculated for $C_{21}H_{28}N_4S_4$.

THIOLCARBONATES

In the preparation of thiolcarbonates the solution contained 32.2 grams (0.1 mole) of free mercaptan, 6.3 grams (0.1 mole) of 90% potassium hydroxide, 500 ml.

of acetone and 10 ml. of water. In addition, the reaction mixture was stirred at 25–30° C. for 24 hours. Following is illustrative of this group:

NO. 34

S-[6 - (1,2,3,4 - tetrahydro-2-thioxo-4,4,6-trimethyl-1-pyrimidinyl)-2-benzothiazolyl] O-ethylthiolcarbonate in 86.2% yield from ethyl chloroformate. The product was a yellow-green solid melting at 127–129° C. after recrystallization from ethyl alcohol. Analysis gave 10.02% nitrogen and 24.49% sulfur compared to 10.68% nitrogen and 24.44% sulfur calculated for $C_{17}H_{19}N_3O_2S_3$.

NO. 35

S - [6 - 1,2,3,4-tetrahydro-2-thioxo-4,4,6-trimethyl-1-pyrimidinyl)-2-benzothiazolyl] O-methylthiolcarbonate in 79.2% yield from methyl chloroformate. The product was a brown solid melting at 120–122° C. after recrystallization from ethyl alcohol. Analysis gave 10.26% nitrogen and 25.00% sulfur compared to 11.07% nitrogen and 25.35% sulfur calculated for $C_{16}H_{17}N_3O_2S_3$.

NO. 36

S - [6 - 1,2,3,4-tetrahydro-2-thioxo-4,4,6-trimethyl-1-pyrimidinyl)-2-benzothiazolyl] O-isopropylthiolcarbonate in 83.8% yield from isopropyl chloroformate. The product was a brown solid melting at 156–158° C. after recrystallization from ethyl alcohol. Analysis gave 9.78% nitrogen compared to 10.31% calculated for $$C_{18}H_{21}N_3O_2S_3$$

NO. 37

S - [6 - (1,2,3,4-tetrahydro-2-thioxo-4,4,6-trimethyl-1-pyrimidinyl)-2-benzothiazolyl] O-pentylthiolcarbonate in 45.9% yield from amyl chloroformate. The product was a tan solid melting at 142–144° C. after recrystallization from alcohol/acetone. Analysis gave 9.95% nitrogen and 21.79% sulfur compared to 9.65% nitrogen and 22.08% sulfur calculated for $C_{20}H_{25}N_3O_2S_3$.

NO. 38

O-allyl S - [6 - (1,2,3,4-tetrahydro-2-thioxo-4,4,6-trimethyl - 1-pyrimidinyl)-2-benzothiazolyl]thiolcarbonate in 14.9% yield from allyl chloroformate. The product was a tan solid melting at 133° C. with decomposition. Analysis gave 10.58% nitrogen compared to 10.36% calculated for $C_{18}H_{19}N_3O_2S_3$.

NO. 39

O,O'-oxydiethylene bis {S-[6-(1,2,3,4-tetrahydro-2-thioxo - 4,4,6 - trimethyl-1-pyrimidinyl)-2-benzothiazolyl]thiolcarbonate} in 87.5% yield from one-half mole of

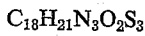

The product was a tan solid melting at 108° C. with decomposition. Analysis gave 9.98% nitrogen compared to 10.49% calculated for $C_{34}H_{36}N_6O_5S_6$.

NO. 40

O,O'-ethylenebis {S - [6 - 1,2,3,4-tetrahydro-2-thioxo-4,4,6 - trimethyl - 1-pyrimidinyl)-2-benzothiazolyl]thiolcarbonate} in 87.0% yield from one-half mole of

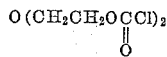

The product was a yellow solid melting at 135° C. with decomposition. Analysis gave 10.66% nitrogen compared to 11.10% calculated for $C_{32}H_{32}N_6O_4S_6$.

NO. 41

S-methyl S' - [6-(1,2,3,4-tetrahydro-2-thioxo-4,4,6-trimethyl - 1 - pyrimidinyl)-2-benzothiazolyl]dithiolcarbonate in 93% yield from methyl chlorothiolformate. In this preparation 300 ml. of acetone and 10 ml. of water were employed to prepare the solution of free mercaptan. The product was a brown solid melting at 146–148° C. Analysis gave 10.67% nitrogen compared to 10.62% calculated for $C_{16}H_{17}N_2OS_4$.

NO. 42

Ethyl 6-(1,2,3,4-tetrahydro-2-thioxo-4,4,6-trimethyl-1-pyrimidinyl)-2-benzothiazolyl dithiolcarbonate in 90.5% yield from ethyl chlorothiolformate. Again 300 ml. of acetone and 10 ml. of water were employed to prepare the solution of free mercaptan. After stirring at 25–30° C. for 24 hours, 300 ml. of water and 500 ml. of ethyl ether were added, stirring continued for 15 minutes and the reaction mixture filtered to remove a small amount of impurities. The ether layer was separated, washed with water until the washings were neutral to litmus and dried over sodium sulfate. Upon removal of ether in vacuo, a brown solid resulted melting at 135–137° C. after recrystallization from ethyl alcohol. Analysis gave 10.63% nitrogen and 30.75% sulfur compared to 10.26% nitrogen and 31.31% sulfur calculated for $C_{17}H_{19}N_3OS_4$.

FURTHER EXAMPLES OF THIOETHERS

Examples 43–45 illustrate examples of functionally substituted thioethers:

EXAMPLE 43

A solution was prepared by mixing 32.2 grams (0.1 mole) of free mercaptan, 6.6 grams (0.1 mole) of 85% potassium hydroxide and 500 ml. of acetone. To the solution so prepared was added with stirring 13.4 grams (0.1 mole) of $CH_3COCHClCOCH_3$ and the stirred reaction mixture heated at 50–60° C. for 5 hours. After cooling to 25° C., 500 ml. of water was added and stirring continued for 30 minutes. The crude product was further cooled to 10° C., the precipitate was filtered, washed with water until neutral to litmus and air-dried at room temperature. 1-[2-(1-acetylacetonylthio)-6-benzothiazolyl]-1,2,3,4-tetrahydro-2-thioxo-4,4,6-trimethylpyrimidine was obtained in 88.5% yield melting at 194–196° C. after recrystallization from benzene. Analysis gave 9.66% nitrogen compared to 10.02% calculated for $C_{19}H_{21}N_3O_2S_3$.

EXAMPLE 44

Substituting 0.1 mole of $CH_3COCHClCOOC_2H_5$ for the chloro compound of Example 43, ethyl 6-(1,2,3,4-tetrahydro-2-thioxo-4,4,6-trimethyl-1-pyrimidinyl)-2-benzothiazolylthioacetoacetate was obtained in 51.3% yield melting at 172–173° C. after recrystallization from ethyl acetate. Analysis gave 9.55% nitrogen and 21.04% sulfur compared to 9.35% nitrogen and 21.40% sulfur calculated for $C_{20}H_{23}N_3O_3S_3$.

EXAMPLE 45

In this example $ClCH(COOC_2H_5)_2$ was substituted in equimolar amount and the stirred reaction mixture heated at 50–60° C. for 8 hours. Diethyl 6-(1,2,3,4-tetrahydro-2-thioxo-4,4,6-trimethyl-1-pyrimidinyl) - 2 - benzothiazolylthiomalonate was obtained in 83.6% yield melting at 168–170° C. after recrystallization from chloroform/ether. Analysis gave 8.91% nitrogen and 20.59% sulfur compared to 8.76% nitrogen and 20.05% sulfur calculated for $C_{21}H_{25}N_3O_4S_3$.

Further examples of thioethers prepared by similar procedure are illustrated by Examples 46–49.

EXAMPLE 46

To a stirred solution containing 32.2 grams (0.1 mole) of free mercaptan, 6.3 grams (0.1 mole) of 90% potassium hydroxide, 400 ml. of acetone and 10 ml. of water was added in one portion 10.9 grams (0.1 mole) of ethyl bromide and the stirred reaction mixture heated at 50–56° C. for 5 hours. After cooling to 25° C., 600 ml. of water were added and stirring continued for 30 minutes. The precipitate was collected by filtration, washed with water until the washings were neutral to litmus and air-dried at 25–30° C. 6-(1,2,3,4-tetrahydro-2-thioxo-4,4,6 - trimethyl-1-pyrimidinyl)-2-ethylthiobenzothiazole was obtained in 74% yield as a light tan solid melting at 202–204° C. after recrystallization from dilute acetone. Analysis gave 11.93% nitrogen compared to 12.02% calculated for $C_{16}H_{19}N_3S_3$.

EXAMPLE 47

An equimolar amount of methyl iodide was substituted for the ethyl bromide in Example 46. 6-(1,2,3,4-tetrahydro-2-thioxo-4,4,6-trimethyl - 1 - pyrimidinyl)-2-methylthiobenzothiazole was obtained in 83.4% yield as a brown solid melting at 216–218° C. after recrystallization from dilute acetone. Analysis gave 12.10% nitrogen and 28.14% sulfur compared to 12.53% nitrogen and 28.67% sulfur calculated for $C_{15}H_{17}N_3S_3$.

EXAMPLE 48

Again employing the procedure of Example 46, 0.1 mole (20.3 grams) of dodecenyl chloride (5,5,7,7-tetramethyl-2-octenyl chloride), was substituted for the ethyl bromide. 6-(1,2,3,4-tetrahydro-2-thioxo-4,4,6 - trimethyl-1 - pyrimidinyl) - 2 - (5,5,7,7-tetramethyl-2-octenylthio)benzothiazole was obtained in 86.5% yield as a brown solid melting at 168–170° C. after recrystallization from dilute acetone. Analysis gave 8.43% nitrogen and 19.13% sulfur compared to 8.62% nitrogen and 19.72% sulfur calculated for $C_{26}H_{37}N_3S_3$.

EXAMPLE 49

In this example 13.3 grams (0.1 mole) of 2-chlorocyclohexanone was substituted for the ethyl bromide of Example 46. The stirred reaction mixture was heated at 55–56° C. for 4 hours. After cooling to 25° C., the mixture was added to 1000 grams of ice-water, stirred at 0–10° C. for one hour and isolated as described in Example 46. 1-[2-(2-oxocyclohexylthio)-6-benzothiazolyl]-1,2,3,4-tetrahydro-2-thioxo-4,4,6-trimethylpyrimidine was obtained in 83.7% yield as a tan solid melting at 194–195° C. after recrystallization from benzene/chloroform. Analysis gave 10.03% nitrogen compared to 10.06% calculated for $C_{20}H_{23}N_3OS_3$.

MISCELLANEOUS EMBODIMENTS OF THE INVENTION

EXAMPLE 50

To a stirred solution containing 16.1 grams (0.05 mole) of free mercaptan, 250 ml. of acetone and 3.3 grams (0.05 mole) of 85% potassium hydroxide was added in one portion 13.7 grams (0.05 mole) of 2,4,5-trichlorophenoxyacetyl chloride. The stirred reaction mixture was heated at 50–60° C. for 6 hours. After cooling to 5° C., 300 ml. of ice-water was added. After stirring for 30 minutes, the precipitate was collected by filtration, washed with water until the washings were neutral to litmus and air-dried at 25–30° C. 1-[2-(2-,4,5-trichlorophenoxyacetylthio) - 6 - benzothiazolyl] - 1,2,3,4 - tetrahydro-2-thioxo-4,4,6-trimethylpyrimidine was obtained in 98.6% yield as a tan solid melting at 178–180° C. Analysis gave 7.66% nitrogen and 19.50% chlorine compared to 7.98% nitrogen and 20.19% chlorine calculated for $C_{22}H_{18}Cl_3N_3O_2S_2$.

EXAMPLE 51

To a stirred solution containing 32.2 grams (0.1 mole) of free mercaptan, 400 ml. of acetone, 10 ml. of water and 6.3 grams (0.1 mole) of 90% potassium hydroxide was added in one portion 16.1 grams (0.1 mole) of 3-bromocyclohexene. The reaction mixture was heated at 50–56° C. for 4 hours, added to 1000 grams of ice-water and stirred at 0–10° C. for one hour. The precipitate was collected by filtration, washed with water until neutral to litmus and air-dried at 25–30° C. 2-(2-cyclohexenylthio)-6-(1,2,3,4-tetrahydro-2-thioxo - 4,4,6 - trimethyl-1-pyrimidinyl)benzothiazole was obtained in 89.5% yield as a light tan solid melting at 217–219° C. Analysis gave 10.16% nitrogen compared to 10.46% calculated for $C_{20}H_{23}N_3S_3$.

EXAMPLE 52

A stirred slurry containing 64.3 grams (0.2 mole) of free mercaptan, 30 grams (0.3 mole—50% excess) of hexamethyleneimine and 400 ml. of isopropyl alcohol was heated at 45–50° C. for 1 hour. Then, 156 ml. (0.3 mole) of sodium hypochlorite solution containing 14.28 grams of sodium hypochlorite per 100 ml. was added dropwise below the surface at 45–50° C. over a 2 hour period and the reaction mixture held at 45–50° C. for an additional hour. Thereupon, 5 grams of anhydrous sodium sulfite and 1000 ml. of water were added and the stirred reaction mixture cooled to 10° C. The precipitate was collected by filtration, washed with water until neutral to litmus and air-dried at 25–30° C. 2-(1-hexamethyleneiminethio) - 6-(1,2,3,4 - tetrahydro - 2-thioxo-4,4,6-trimethylpyrimidinyl)benzothiazole was obtained in 93.5% yield as a brown solid melting at 170–173° C. with decomposition. The melting point remained unchanged after recrystallization from ethyl alcohol. Analysis gave 13.96% nitrogen and 22.06% sulfur compared to 13.38% nitrogen and 22.98% sulfur calculated for $C_{20}H_{26}N_4S_3$.

EXAMPLE 53

In the procedure of Example 52, 60.2 grams (0.6 mole—200% excess) of morpholine was substituted for the hexamethyleneimine. After isolating the product as described, it was dissolved in an excess of ethyl alcohol and filtered to remove a small amount of impurities. The filtrate was diluted with an equal amount of water, cooled to 0° C. and the precipitate collected by filtration. After recrystallization from a minimum amount of ethyl alcohol, the 2 - morpholinothio-6-(1,2,3,4-tetrahydro-2-thioxo-4,4,6 - trimethyl - 1 - pyrimidinyl)benzothiazole thus obtained was a tan solid melting at 168–170° C. with decomposition. Analysis gave 13.70% nitrogen and 22.75% sulfur compared to 13.78% nitrogen and 23.66% sulfur calculated for $C_{18}H_{22}N_4OS_3$.

EXAMPLE 54

Replacing the hexamethyleneimine of Example 52 with 69 grams (0.6 mole) of cis- and trans-2,6-dimethylmorpholine, 2 - (2,6-dimethylmorpholinothio)-6-(1,2,3,4-tetrahydro - 2 - thioxo-4,4,6-trimethyl-1-pyrimidinyl)benzothiazole was obtained in 98% yield as a buff solid melting at 115–123° C. with decomposition. After recrystallization as described in Example 53, the product melted at 123–125° C. with decomposition. Analysis gave 12.19% nitrogen compared to 12.89% calculated for $C_{20}H_{26}N_4OS_3$.

EXAMPLE 55

To a stirred solution containing 32.2 grams (0.1 mole) of free mercaptan, 300 ml. of acetone, 10 ml. of water and 6.3 grams (0.1 mole) of 90% potassium hydroxide was added in one portion a solution containing 9.5 grams (0.1 mole) of chloroacetic acid, 50 ml. of water and 7 grams of anhydrous sodium carbonate and having a pH of 8. The stirred reaction mixture was heated at reflux for 6 hours, cooled to 25° C. and the pH adjusted to 5 by the addition dropwise of 10 grams of concentrated hydrochloric acid. The slurry was stirred at 0–10° C. for 15 minutes, the precipitate collected by filtration, washed with water until the washings were neutral to litmus and air-dried at 25–30° C. 6-(1,2,3,4-tetrahydro-2-thioxo-4,4,6-trimethyl-1-pyrimidinyl) - 2 - benzothiazolylthioacetic acid was obtained in 79% yield as a tan tan solid melting at 196–198° C. with decomposition. Analysis gave 11.20% nitrogen compared to 11.07% calculated for $C_{16}H_{17}N_3O_2S_3$.

Useful properties for accelerating the vulcanization of rubber are illustrated by the following test. A base stock was compounded comprising

| | Parts by weight |
|---|---|
| Smoked sheets rubber | 100 |
| Carbon black | 50 |
| Zinc oxide | 5 |
| Stearic acid | 3 |
| Saturated hydrocarbon softener | 3 |
| Sulfur | 2.5 |

To each of several portions of the base stock was added 0.5 part by weight of accelerator as indicated below:

Stock:
- A _____ Product of Example 2.
- B _____ Product of Example 8.
- C _____ Product of Example 12.
- D _____ Product of Example 13.
- E _____ Product of Example 14.
- F _____ Product of Example 17.
- G _____ Product of Example 19.
- H _____ Product of Example 43.
- I _____ Product of Example 44.
- J _____ Product of Example 45.

The stocks were cured in the usual manner by heating in a press for different periods of time at 144° C. The modulus and tensile properties of the 30 minute cures are recorded below except for Stock A for which properties of the 60 minute cure are recorded.

Table II

| Stock | Modulus of Elasticity in lbs./in.$^2$ at Elongation of 300% | Tensile at Break in, lbs./in.$^2$ | Ultimate Elongation, (percent) |
|---|---|---|---|
| A | 890 | 1,690 | 490 |
| B | 1,500 | 2,650 | 460 |
| C | 1,100 | 2,490 | 520 |
| D | 1,200 | 2,520 | 500 |
| E | 920 | 2,280 | 550 |
| F | 1,170 | 2,440 | 500 |
| G | 1,150 | 2,580 | 500 |
| H | 890 | 2,130 | 550 |
| I | 1,170 | 2,220 | 470 |
| J | 1,000 | 2,260 | 500 |

As further illustrative of the invention, natural rubber tread stocks were compounded comprising:

| | Parts by weight |
|---|---|
| Smoked sheets rubber | 100.0 |
| Carbon black | 50.0 |
| Zinc oxide | 5.0 |
| Stearic acid | 3.0 |
| Saturated hydrocarbon softener | 3.0 |
| Sulfur | 2.5 |
| Antioxidant | 1.0 |
| Accelerator | 0.5 |

The accelerator added to the base stock is indicated below:

Stock:
- K _____ Product of Example 3.
- L _____ Product of Example 4.
- M _____ Product of Example 10.
- N _____ Product of Example 21.
- O _____ Product of Example 22.
- P _____ Product of Example 23.
- Q _____ Product of Example 24.
- R _____ Product of Example 25.
- S _____ Product of Example 26.
- T _____ Product of Example 34.
- U _____ Product of Example 35.
- V _____ Product of Example 36.
- W _____ Product of Example 37.
- X _____ Product of Example 39.
- Y _____ Product of Example 40.
- Z _____ Product of Example 41.
- AA _____ Product of Example 42.
- BB _____ Product of Example 47.
- CC _____ Product of Example 46.
- DD _____ Product of Example 48.
- EE _____ Product of Example 52.
- FF _____ Product of Example 53.
- GG _____ Product of Example 54.
- HH _____ Product of Example 7.
- II _____ Product of Example 55.

The stocks were cured in the usual manner by heating in a press for different periods of time at 144° C. Processing safety of the vulcanizable stocks was evaluated by means of a Mooney plastometer. The figures recorded were the times required for the Mooney plasticity at 135° C. to rise ten points above the minimum value. The modulus and tensile properties of the 60 minute cures are recorded:

Table III

| Stock | Modulus of Elasticity in lbs./in.$^2$ at Elongation of 300% | Tensile at Break in, lbs/in.$^2$ | Mooney Scorch at 135° C. |
|---|---|---|---|
| K | 1,710 | 2,580 | |
| L | 1,210 | 2,000 | 14.0 |
| M | 900 | 1,720 | |
| N | 1,250 | 2,150 | 12.8 |
| O | 1,880 | 3,600 | 13.6 |
| P | 1,170 | 2,240 | 11.5 |
| Q | 1,500 | 2,050 | 12.4 |
| R | 1,950 | 2,980 | 12.7 |
| S | 1,710 | 3,060 | 13.3 |
| T | 1,610 | 2,380 | 10.3 |
| U | 1,400 | 2,220 | 15.7 |
| V | 1,500 | 2,440 | 10.5 |
| W | 1,400 | 2,340 | 11.1 |
| X | 1,400 | 1,950 | 10.7 |
| Y | 1,500 | 2,380 | 10.6 |
| Z | 1,550 | 2,670 | 13.0 |
| AA | 1,490 | 2,520 | 13.7 |
| BB | 1,320 | 2,450 | 14.7 |
| CC | 1,490 | 2,650 | 10.4 |
| DD | 1,230 | 2,190 | 12.7 |
| EE | 2,050 | 3,250 | 9.1 |
| FF | 1,650 | 2,650 | 12.6 |
| GG | 1,560 | 2,640 | 12.4 |
| HH | 680 | 1,260 | 29.2 |
| II | 970 | 2,010 | 24.5 |

As further examples of the invention rubber base stocks were prepared comprising:

| | Parts by weight |
|---|---|
| Smoked sheets rubber | 100.0 |
| Carbon black | 50.0 |
| Zinc oxide | 5.0 |
| Stearic acid | 3.0 |
| Saturated hydrocarbon softener | 3.0 |
| Antioxidant | 1.5 |
| Sulfur | 2.5 |
| Accelerator | 0.5 |

Accelerators added to the base stock were:

Stock:
- JJ _____ Product of Example 27.
- KK _____ Product of Example 28.
- LL _____ Product of Example 29.
- MM _____ Product of Example 30.
- NN _____ Product of Example 31.
- OO _____ Product of Example 32.
- PP _____ Product of Example 33.

The compositions were vulcanized by heating for different periods of time in the usual manner in a press at 144° C. The accelerating properties of the 15 minute cures and processing safety are recorded in Table IV.

Table IV

| Stock | Modulus of Elasticity in lbs./in.² at Elongation of 300% | Tensile at Break in, lbs./in.² | Mooney Scorch Time at 135° C., Time in Mins. for 10 Point Rise Above Minimum |
|---|---|---|---|
| JJ | 2,160 | 4,350 | 10.6 |
| KK | 1,640 | 3,780 | 11.6 |
| LL | 1,630 | 3,580 | 9.9 |
| MM | 1,510 | 3,240 | 9.3 |
| NN | 2,080 | 4,200 | 10.0 |
| OO | 1,010 | 2,380 | 8.3 |
| PP | 2,000 | 3,900 | 9.8 |

It is intended to cover all changes and modifications of the examples of the invention herein chosen for purposes of disclosure which do not constitute departures from the spirit and scope of the invention.

What is claimed is:

1. A compound of the formula $$[TS]_nR$$

where T is 6-(1,2,3,4-tetrahydro-2-thioxo-4,6,6-trimethyl-1-pyrimidinyl-2-benzothiazolyl, $n$ is an integer equal to the valence of R selected from the group consisting of 1 and 2 and R is selected from a group consisting of lower alkyl alkenyl of 3–12 carbon atoms inclusive, monochloroloweralkenyl, dichloroloweralkenyl, trichloroloweralkenyl, propynyl, 2-butenylene, 2-butynylene, diloweralkylaminoethyl, 1-acetylacetonyl, 1-carbethoxyacetonyl, diethylmalonyl carboxymethyl, 2-oxocyclohexyl and 2-cyclohexenyl.

2. 6-(1,2,3,4-tetrahydro - 2 - thioxo-4,6,6-trimethyl-1-pyrimidinyl)-2-loweralkylthiobenzothiazole.

3. The 2-alkenylthio) ethers of 6-(1,2,3,4-tetrahydro-2-thioxo-4,6,6-trimethyl - 1 - pyrimidinyl)-benzothiazole wherein the alkenyl radical contains 3–12 carbon atoms.

4. The 2-(monochloroloweralkenylthio) ethers of 6-(1,2,3,4-tetrahydro-2-thioxo-4,6,6-trimethyl - 1 - pyrimidinyl)-benzothiazole.

5. 1-[2-(2 - diloweralkylaminoethylthio) - 2 - benzothiazolyl]-1,2,3,4-tetrahydro - 2 - thioxo-4,6,6-trimethylpyrimidine.

6. 1,2,3,4-tetrahydro-2 - thioxo-1-(2-mercapto-6-benzothiazolyl)-4,4,6-trimethylpyrimidine.

7. 6-(1,2,3,4-tetrahydro - 2 - thioxo-4,4,6-trimethyl-1-pyrimidinyl)-2-methylthiobenzothiazole.

8. 1,2,3,4-tetrahydro - 2 - thioxo-1-[2-(p-nitrosopiperazinomethylthio) - 6 - benzothiazolyl]-4,4,6-trimethylpyrimidine.

9. 1,4-dihydro - 1 - [2-hexamethyleniminemethylthio)-6 - benzothiazolyl]-1,2,3,4-tetrahydro - 2 - thioxo-4,4,6-trimethylpyrimidine.

10. 1-[(2 - anilinomethylthio) - 6 - benzothiazolyl]-1,2,3,4-tetrahydro-2-thioxo-4,4,6-trimethylpyrimidine.

11. 6-(1,2,3,4-tetrahydro - 2 - thioxo-4,4,6-trimethyl-1-pyrimidinyl)-2-benzothiazolylthioacetic acid.

No references cited.